(12) United States Patent
Samii

(10) Patent No.: US 10,324,636 B2
(45) Date of Patent: Jun. 18, 2019

(54) FAIL-OPERATIONAL SYSTEM DESIGN PATTERN BASED ON SOFTWARE CODE MIGRATION

(71) Applicant: GM GLOBAL TECHNOLOGY OPERATIONS LLC, Detroit, MI (US)

(72) Inventor: Soheil Samii, Royal Oak, MI (US)

(73) Assignee: GM Global Technology Operations LLC., Detroit, MI (US)

(*) Notice: Subject to any disclaimer, the term of this patent is extended or adjusted under 35 U.S.C. 154(b) by 334 days.

(21) Appl. No.: 15/246,793

(22) Filed: Aug. 25, 2016

(65) Prior Publication Data
US 2018/0059963 A1 Mar. 1, 2018

(51) Int. Cl.
G06F 3/06 (2006.01)
G06F 11/07 (2006.01)

(52) U.S. Cl.
CPC .......... G06F 3/0619 (2013.01); G06F 3/065 (2013.01); G06F 3/0647 (2013.01); G06F 3/0688 (2013.01); G06F 11/07 (2013.01)

(58) Field of Classification Search
CPC ...... G06F 3/0619; G06F 11/07; G06F 3/0647; G06F 3/065; G06F 3/0688
See application file for complete search history.

(56) References Cited

U.S. PATENT DOCUMENTS

| | | | |
|---|---|---|---|
| 5,646,845 A * | 7/1997 | Gudat | B60K 31/0008 701/26 |
| 9,195,232 B1 * | 11/2015 | Egnor | G05D 1/0055 |
| 2006/0162986 A1 * | 7/2006 | Disser | B60T 8/885 180/402 |
| 2014/0277608 A1 * | 9/2014 | Debouk | G05B 9/03 700/79 |

* cited by examiner

*Primary Examiner* — Michael Alsip
(74) *Attorney, Agent, or Firm* — Quinn IP Law

(57) ABSTRACT

A fail-operational control system includes a migrating controller having a non-volatile memory, a RAM, and a CPU. The migrating controller includes software code stored in the non-volatile memory of the migrating controller. The software code stored in the non-volatile memory of the migrating controller executed by the CPU of the migrating controller is dedicated to a respective system. The respective system is not under the control of a primary controller from another system. In response to an enablement of a system operation of the primary controller of another system that requires a backup controller during execution of the system operation, fail-operational software code stored in the non-volatile memory of the primary controller of the other system is transferred to the RAM of the migrating controller. The migrating controller temporarily functions as a backup controller during the execution of the system operation in the primary controller of the other system.

22 Claims, 3 Drawing Sheets

FAIL-OPERATIONAL SYSTEM DESIGN PATTERN BASED ON SOFTWARE CODE MIGRATION

BACKGROUND OF INVENTION

An embodiment relates to fault tolerant control systems.

Systems which provide safety functions typically utilize redundant controllers to ensure safety by shutting down functions that have experienced a fault or failure. Such systems are known as fail-silent systems. If a fault is detected, controls are shut down for the feature and the feature will no longer be operable in the system.

Some systems try to implement control systems utilizing a fail-operational system where additional controllers are used to ensure that a safe operation can be continued for a duration of time, such as dual duplex controllers. If a first controller fails and falls silent, a second controller will be activated and all actuators will switch over to rely on requests from the second controller. Other types of systems that utilize non-symmetrical implementation of controllers may avoid duplicative hardware and software faults. However, in either case, utilizing a second controller that is dedicated solely for the purpose of only being a backup controller to the primary controller is inefficient, and potentially more costly, in terms of resource usage (e.g., memory or CPU usage).

SUMMARY OF INVENTION

An advantage of an embodiment is the utilization of a backup controller that reduces the non-volatile memory of the backup controller by migrating software for execution to the random access memory of the backup controller from the non-volatile memory of the primary controller. Migration of software code to a backup controller reduces the use of non-volatile memory requirements in fail operational architectures for electronic control units which also reduces the cost and increases efficiencies in processor design. This technique optimizes non-volatile member while enabling and increasing controller consolidation thereby reducing component costs.

An embodiment contemplates a fail-operational control system. A primary controller includes a non-volatile memory and a central processing unit for executing software code stored in the non-volatile memory of the primary controller. The software code stored in the non-volatile memory of the primary controller includes non-critical software and fail-operational software executed by the central processing unit of the primary controller during non-failed and failed states. A migrating controller includes a non-volatile memory, a random access memory, and a central processing unit. The migrating controller includes software code stored in the non-volatile memory of the migrating controller. The software code stored in the non-volatile memory of the migrating controller executed by the central processing unit of the migrating controller is dedicated to a respective system. The respective system is not under the control of the primary controller. In response to an enablement of a system operation of the primary controller that requires a backup controller during execution of the system operation, fail-operational software code stored in the non-volatile memory of the primary controller relating the system operation is transferred to the random access memory of the migrating controller. The migrating controller temporarily functions as a backup controller during the execution of the system operation in the primary controller.

An embodiment contemplates a fail-operational control system. A migrating controller includes a non-volatile memory, a random access memory, and a central processing unit. The migrating controller includes software code stored in the non-volatile memory of the migrating controller. The software code stored in the non-volatile memory of the migrating controller executed by the central processing unit of the migrating controller is dedicated to a respective system. The respective system is not under the control of a primary controller from another system. In response to an enablement of a system operation of the primary controller of another system that requires a backup controller during execution of the system operation, fail-operational software code stored in the non-volatile memory of the primary controller of the other system is transferred to the random access memory of the migrating controller. The migrating controller temporarily functions as a backup controller during the execution of the system operation in the primary controller of the other system.

A method of reconfiguring a controller for fail-operational conditions. A migrating controller is selected to transfer fail-operational software code during a failure of a primary controller from another system. The migrating controller is not under the control of the primary controller of another system that the primary controller controls. A system operation of the primary controller requiring a backup controller is enabled during execution of the system operation in the primary controller. Fail-operational software code in a non-volatile memory of the primary controller is transferred to a random access memory of the migrating controller. The migrating controller includes software code stored in the non-volatile memory of the migrating controller that is dedicated to another system different than the system controlled by the primary controller. A fault is detected in the primary controller. The fail-operational software code is executed in the random access memory of the migrating controller in response to the detecting the fault in the primary controller.

DETAILED DESCRIPTION

Figure 1:
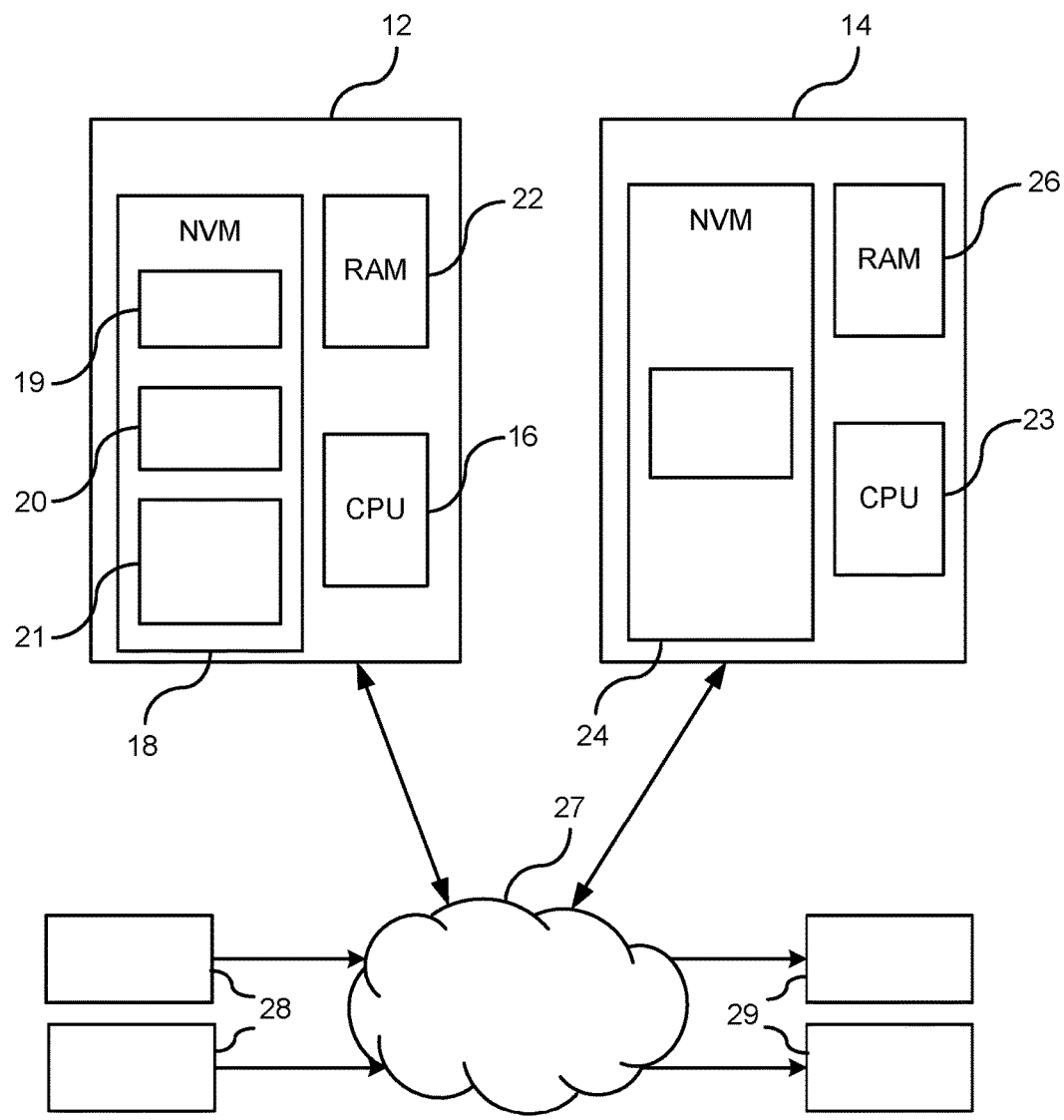
FIG. 1 is an architectural block diagram of an integrated fail-silent and fail-operational control system.

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to maintain safety control functions in controllers executing software functions in control systems. While the approach and methodology are described below with respect to controllers used in vehicle applications, one of ordinary skill in the art appreciates that an automotive application is merely exemplary, and that the concepts disclosed herein may also be applied to any other suitable communications system such as, for example, general industrial automation applications, manufacturing and assembly applications, avionics, aerospace, and gaming.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

There is shown in FIG. 1 an architectural block diagram of an exemplary integrated control system. Such control systems will often utilize two controllers so that if a hardware error occurs with a primary controller, then a backup controller may be readily enabled to control a feature of the control system or provide control for limited functionality of the feature in error.

There is shown in FIG. 1 an architectural block diagram of an integrated fail-operational control system. Control systems, including, but not limited to vehicles, planes, and ships that utilize safety-critical systems or autonomous systems, require fault-tolerant countermeasures should an error occur within the control system. Such control systems will often utilize two controllers so that if an error occurs (which results from a fault) with a primary controller, then a backup controller may be readily enabled to control a feature of the control system or provide control for limited functionality of the feature in error.

In FIG. 1, a respective system is shown to include a primary controller 12 and an other feature controller 14 (e.g., migrating controller). The exemplary system as described herein is vehicle based, but as described earlier, the architecture can apply to non-vehicular systems. The primary controller 12 includes at least one central processing unit (CPU) 16 for executing the software. The primary controller 12 further includes a non-volatile memory (NVM) 18 for storing noncritical software 19, fail-silent software 20, and fail-operational software 21. All operating instructions for executing software during a non-fault condition and during a fault condition are stored in the NVM 18 of the primary controller 12. The primary controller 12 further includes RAM 22 to access other data or instructions that are temporarily stored.

The other feature controller 14 includes a similar architecture that includes at least one CPU 23, a NVM 24, and a RAM 26. The other feature controller 14 is a controller that is dedicated to another system or is shared by multiple systems. In a conventional system where there is a backup controller dedicated to the current system, the dedicated backup controller would have the same operational software as well as the noncritical software, fail-silent software, and fail-operational software in the NVM for executing operations during a non-failed state and failed state. As described herein, the other feature controller 14 is dedicated to another system or shared by another system. If the NVM of the primary controller were not capable of storing additional instructions (i.e., the fail operational backup software), then an additional designated controller would be required or another feature controller would need to be upgraded with additional NVM memory which would be inefficient.

To overcome this issue, software code migration and reconfiguration is executed on the other feature controller 14. The fail-operational software of the primary controller 12 is transferred to the RAM 26 of the other feature controller 14 to allow the other feature controller 14 to control operations of the failed system should a failure occur in the primary controller 12.

A communication network 27 is utilized that allows the primary controller 12 and the other feature controller 14 to communicate with one another and to transfer software code from the NVM 18 of the primary controller 12 to the RAM 26 of the other feature controller 14. It should be understood that the communication network may include, but is not limited to, communication area network (CAN), CAN-FD, FlexRay, switched networking with Ethernet, wireless communication, or multiple networks using gates. The communication network 27 allows each of the controllers and sensors/actuators to communicate with one another. The primary controller 12 and the other feature controller 14 also utilize the communication network 27 to receive and transmit data between sensors 28 and actuators 29.

Figure 2:
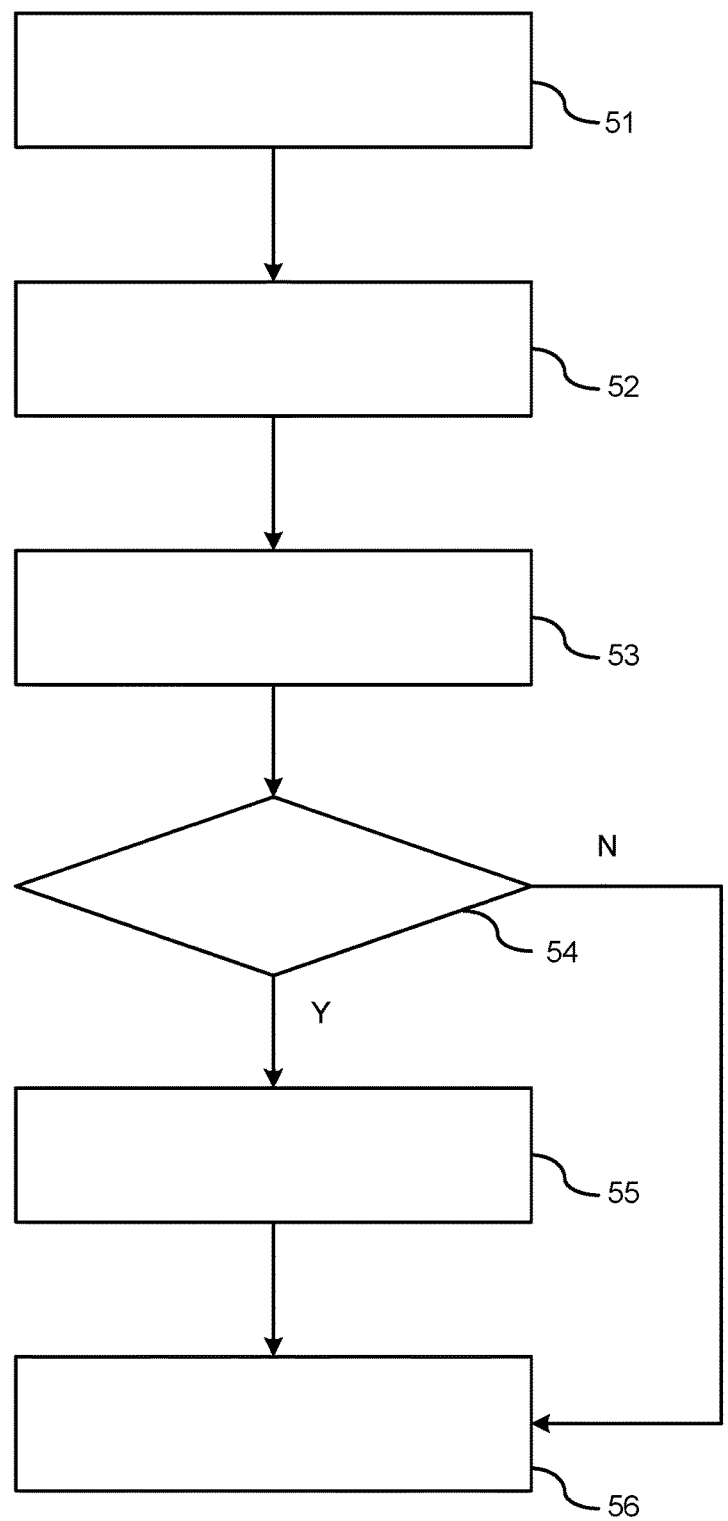
FIG. 2 is flowchart for migrating fail-operational feature software from the primary controller to the other feature controller.

FIG. 2 illustrates a flow diagram relating to the migration of software to the other feature controller. In block 51, a system feature is enabled where a backup controller is required. Examples of such systems include, but are not limited to, adaptive cruise control, autonomous parking, and lane centering.

In block 52, in response to the enablement of a system operation that requires a backup controller in the event that a failure occurs with the primary controller, software code is migrated to the RAM of the other feature controller from the primary controller. The non-volatile memory of the other feature controller has software code that is used for another dedicated system. The software code that is transmitted from the primary controller to the other feature controller and stored in the RAM of the other feature controller will remain stored in the RAM of the other feature controller until the current enabled feature operation is disabled.

In step 53, the reconfiguration of the other feature controller for the system feature is performed. This may include stopping some or all of the executions of the other features to allow for the fail-operational backup to become operational and operate as a hot standby. This is acceptable so long as the other feature is not a critical software required to be executed while the system feature being stored and executed in the RAM is engaged and operational.

In step 54, a determination is made as to whether a failure occurs in the primary controller. If no failure occurs, the routine proceeds to step 56, otherwise the routine proceeds to step 55.

In step 55, in response to a detected failure in the primary controller, the other feature controller executes the software code stored in the RAM of the other feature controller. The other feature controller maintains operation of the system feature until the system feature is complete or until a driver can resume control the autonomous operation. If a fault is also detected in the other feature controller in addition to the primary controller, then primary controller can detect it and take immediate actions such as alerting the driver to take immediate controls of the operation or autonomously moving to a safe area (e.g., side of the road) and actuating various safety features that include, but are not limited to, warning signals).

In step 56, upon safe deactivation of the system feature, the software code is removed from the RAM. If a next system feature is activated that requires a backup controller, the other feature controller, if available, may be used as the backup controller where software code is migrated and stored in the RAM.

It should be understood that more than one feature controller may be utilized as a backup controller. In this case, a respective controller may be selected based on availability. That is, if a controller is currently being utilized by its dedicated system and cannot be utilized as a backup controller, then another feature controller that is available can be selected at that time.

Figure 3:
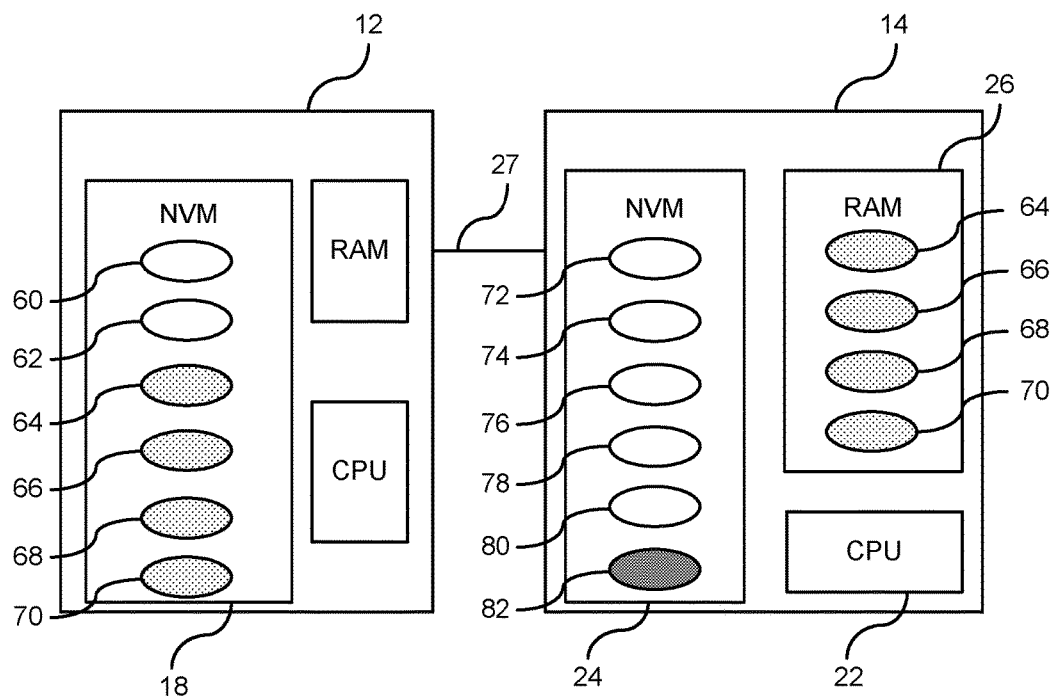
FIG. 3 illustrates a block diagram showing software migration to the RAM of the other feature controller.

FIG. 3 illustrates a block diagram showing the primary controller 12, the other feature controller 14, and the respective software code stored in the respective allocated memory.

The primary controller 12, is for example an external object calculating module (EOCM) controller used to detect objects and avoid collisions. Software code is permanently stored in the NVM 18 of the primary controller 12. Various types of software code governing respective features are identified as being related to a fail-operational feature or a fail-silent or noncritical feature. Examples of software for fail-silent or noncritical features include collision avoidance software 60 and maps/HMI software 62. Examples of software for fail-operational features include situational awareness software 64, adaptive cruise control software 66, vehicle dynamic software 68, and lane centering control software 70.

The other feature controller 14, is for example, a video processing module (VPM) controller used to process video from various video devices of a vehicle. Software code is permanently stored in the NVM 24 of the primary controller 12 for controlling video processing operations. Types of software code stored in the NVM 24 include video processing software 72, pedestrian detection software 74, surround view software 76, parking assist software 78, night vision software 80, and lane sensing software 82. These software codes are dedicated to VPM for executing processes by the VPM controller. While the NVM 24 includes dedicated software for video processing, software from the EOCM controller is migrated to and stored in the RAM 26 of the VPM controller via the communication network 27. As shown, only the software related to the fail-operational features of the EOCM are transferred to the RAM 26 of the VPM controller which includes the situational awareness software 64, adaptive cruise control software 66, vehicle dynamic software 68, and lane centering control software 70. In the event of a failure in the primary controller 12, control will be relinquished to the other feature controller 14 where the respective software code relating to fail-operational features stored in the RAM 26 are executed by the CPU 22 of the other feature controller 14.

As a result, by not having to maintain a duplicate controller that is designated as a backup controller in standby mode awaiting a failure in the primary controller, costs, components, including communication lines, and complexity can be reduced.

Figure 4:
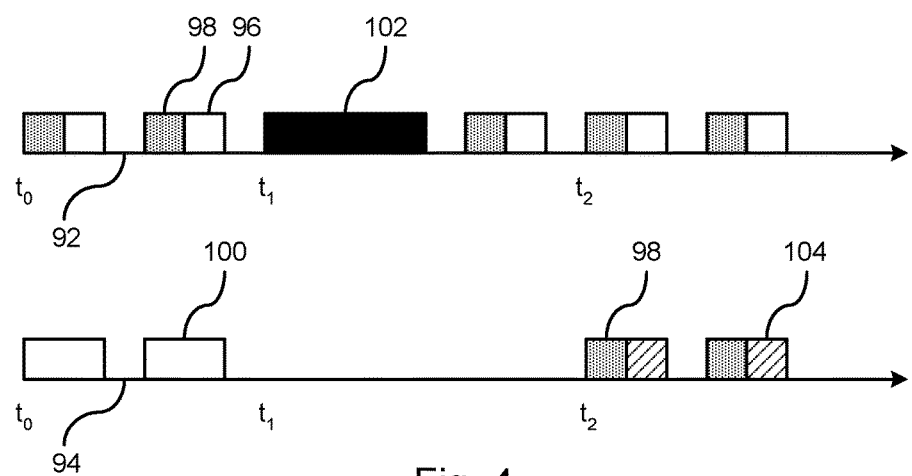
FIG. 4 illustrates a timeline of the software migration and reconfiguration in the two controllers.

FIG. 4 illustrates a timeline for executing software code in each controller. Timeline 92 represents controller processing for the primary controller whereas timeline 94 represents controller processing for the backup controller. At time to, both controllers process software stored in their respective NVM for monitoring and operating their respective systems. In the primary controller, feature execution represented by 96 as shown on the timeline 92 represents software code relating to non-critical feature software whereas feature execution represented by 98 as shown on the timeline 92 represents software code relating to fail-operational features. In the other feature controller, feature execution software in the NVM of the other feature controller is represented by 100. This respective software code executes feature operations that the other feature controller is dedicated to process.

At time $t_1$, software code migration 102 is initiated in the primary controller and other feature controller. Software code migration is triggered when a respective feature is engaged by the primary controller that is identified as a fail-operational feature. Fail-operational features require a backup controller in the event a failure occurs in the primary controller. In response to the execution of the respective feature in the primary controller, software code is migrated from the NVM of the primary controller to the RAM of the other feature controller. As the software code is transmitted to the RAM of the other feature controller, reconfiguration of the other feature controller is performed to function as a backup controller utilizing the software code in the RAM.

At time $t_2$, the primary controller maintains execution of software code of both fail-operational feature operations and non-critical feature operations. The other feature controller is reconfigured to execute the fail-operational feature operations 98 stored in the RAM of the other feature controller. The other feature controller may further continue to execute software code 104 stored in its NVM if it pertains to feature operations stored in the RAM or may continue to execute all software code if there is enough CPU capacity to execute all the software code.

Alternatively, other feature software in the NVM may be turned off or a portion of it turned off. For example, if the software code for lane centering control is stored in the RAM of the other feature controller and the software code for lane sensing is stored in the NVM of the other feature controller, then other feature controller will continue to execute lane sensing which pertains to the fail-operational feature operations. The other feature controller will continue to execute the software code stored in its RAM until the respective feature operation requiring a backup controller is completed or turned off.

While certain embodiments of the present invention have been described in detail, those familiar with the art to which this invention relates will recognize various alternative designs and embodiments for practicing the invention as defined by the following claims.

What is claimed is:

1. A fail-operational control system comprising:
   a primary controller including a non-volatile memory and a central processing unit operable to execute a first software code stored in the non-volatile memory of the primary controller to control operation of a respective first system, wherein the first software code stored in the non-volatile memory of the primary controller includes non-critical software and fail-operational software code executed by the central processing unit of the primary controller during non-failed and failed states; and
   a migrating controller including a non-volatile memory, a random access memory, and a central processing unit, the migrating controller including a second software code, distinct from the first software code, stored in the non-volatile memory of the migrating controller, wherein the second software code stored in the non-volatile memory of the migrating controller and executed by the central processing unit of the migrating controller is dedicated to controlling operation of a respective second system, distinct from the first system controlled by the primary controller, the respective second system being not under the control of the primary controller;
   wherein the primary controller is operable, in response to an enablement of a system operation of the respective first system controlled by the primary controller that requires a backup controller during execution of the system operation, to transfer the fail-operational software code stored in the non-volatile memory of the primary controller to the random access memory of the migrating controller, and
   wherein the migrating controller is operable, in response to a failure occurring in the primary controller, to temporarily function as the backup controller and execute the transferred fail-operational software code during the execution of the system operation in the primary controller.

2. The fail-operational control system of claim 1 further comprising a communication network, wherein the fail-operational software code stored in the non-volatile memory of the primary controller is transferred to the random access memory of the migrating controller via the communication network.

3. The fail-operational control system of claim 1 wherein the fail-operational software code is transferred from the non-volatile memory of the primary controller to the random access memory of the migrating controller when the system operation in the primary controller is enabled.

4. The fail-operational control system of claim 1 wherein the migrating controller is further configured to remove the fail-operational software code from the random access memory upon disablement of the system operation of the respective first system.

5. The fail-operational control system of claim 1 wherein, in response to the failure in the primary controller, the migrating controller functions to execute both the transferred fail-operational software code stored in the random access memory and the second software code stored in the non-volatile memory of the migrating controller.

6. The fail-operational control system of claim 1 further comprising a plurality of system controllers each operable to control a respective system, wherein the migrating controller is selected from the plurality of system controllers.

7. The fail-operational control system of claim 6 wherein the migrating controller is selected based on whether the migrating controller is currently executing the second software code for controlling operation of the respective second system.

8. The fail-operational control system of claim 6 wherein the migrating controller is selected based on whether the second software code stored in the non-volatile memory of the migrating controller is related to the fail-operational software code of the primary controller.

9. The fail-operational control system of claim 1 wherein the fail-operational software code includes operations performed autonomously by the respective first system.

10. The fail-operational control system of claim 1 wherein the fail-operational software code includes operations performed semi-autonomously by the respective first system.

11. The fail-operational control system of claim 1 wherein the fail-operational software code is applied for safety-critical systems.

12. The fail-operational control system of claim 1 wherein the fail-operational software code includes instructions for controlling operation of an adaptive cruise control system of a vehicle.

13. The fail-operational control system of claim 1 wherein the fail-operational software code includes instructions for controlling operation of an autonomous parking system of a vehicle.

14. The fail-operational control system of claim 1 wherein the fail-operational software code includes instructions for controlling operation of a lane centering system of a vehicle.

15. The fail-operational control system of claim 1 wherein the fail-operational software code includes instructions for controlling operation of a collision avoidance system of a vehicle.

16. The fail-operational control system of claim 1 wherein the migrating controller executes a select portion of the second software code stored in the non-volatile memory of the migrating controller and the fail-operational software code transferred from the primary controller and stored in the random access memory in response to the failure occurring in the primary controller.

17. The fail-operational control system of claim 16 wherein the migrating controller executes at least a portion of the second software code stored in the non-volatile memory of the migrating controller relating to the respective second system while concurrently executing the transferred fail-operational software code stored in the random access memory in response to the detected failure.

18. The fail-operational control system of claim 16 wherein the migrating controller is further operable to stop executing the second software code stored in the non-volatile memory of the migrating controller relating to the respective second system while executing the transferred fail-operational software code stored in the random access memory in response to the detected failure.

19. A fail-operational control system for a motor vehicle, the motor vehicle including a primary controller with a non-volatile memory and a central processing unit operable to execute a first software code stored in the non-volatile memory to control operation of a respective first system, the fail-operational control system comprising:

a migrating controller including a non-volatile memory, a random access memory, and a central processing unit, the migrating controller including a second software code, distinct from the first software code, stored in the non-volatile memory of the migrating controller, wherein the second software code stored in the non-volatile memory of the migrating controller and executed by the central processing unit of the migrating controller is dedicated to controlling operation of a respective second system, distinct from the first system controlled by the primary controller, the respective second system being not under the control of the primary controller;

wherein, in response to an enablement of a system operation of the respective first system controlled by the primary controller that requires a backup controller during execution of the system operation, fail-operational software code stored in the non-volatile memory of the primary controller is transferred by the primary controller to the random access memory of the migrating controller, and wherein the migrating controller is operable, in response to a failure occurring in the primary controller, to temporarily function as the backup controller and execute the transferred fail-operational software code during the execution of the system operation in the primary controller.

20. The fail-operational control system of claim 19 wherein the fail-operational software code is transferred from the non-volatile memory of the primary controller to the random access memory of the migrating controller when the system operation in the primary controller is enabled.

21. The fail-operational control system of claim 19 wherein the migrating controller is further configured to remove the fail-operational software code from the random access memory upon disablement of the system operation of the respective first system.

22. A method of operating a fail-operational control system, the method comprising the steps of:

detecting if a failure has occurred in a primary controller with a non-volatile memory (NVM) and a central processing unit (CPU), the CPU being operable to execute a first software code stored in the NVM of the primary controller to control operation of a respective first system, the first software code including non-critical software and fail-operational software code executed by the CPU of the primary controller during non-failed and failed states;

selecting a migrating controller with a NVM, a random access memory (RAM), and a CPU, the migrating controller including a second software code, distinct from the first software code, stored in the NVM of the migrating controller, the second software code being executed by the CPU of the migrating controller to control operation of a respective second system, distinct from the first system and not controlled by the primary controller;

transferring the fail-operational software code, from the NVM of the primary controller to the RAM of the migrating controller, responsive to the detected during a failure of the primary controller from another system, the migrating controller not under the control of the primary controller;

enabling a system operation of the respective first system controlled by the primary controller requiring a backup controller during execution of the system operation in the primary controller;

detecting a fault in the primary controller; and executing the fail-operational software code in the random access memory of the migrating controller in response to the detecting the fault in the primary controller.

* * * * *